(12) United States Patent
Copeland

(10) Patent No.: US 8,256,540 B1
(45) Date of Patent: Sep. 4, 2012

(54) SELF-STORING RETAINER CAP ASSEMBLY

(75) Inventor: Daniel James Copeland, Franklin, TN (US)

(73) Assignees: Tadano Ltd., Sanuki-shi (JP); Tadano Mantis Corporation, Franklin, TN (US)

( * ) Notice: Subject to any disclaimer, the term of this patent is extended or adjusted under 35 U.S.C. 154(b) by 0 days.

(21) Appl. No.: 13/074,838

(22) Filed: Mar. 29, 2011

(51) Int. Cl.
*B62D 55/00* (2006.01)

(52) U.S. Cl. ........ 180/9.1; 180/9.5; 180/9.46; 180/9.52; 180/9.6

(58) Field of Classification Search .................. 180/9.1, 180/9.46, 9.52, 9.6
See application file for complete search history.

(56) References Cited

U.S. PATENT DOCUMENTS

| | | | | |
|---|---|---|---|---|
| 7,967,087 | B2 * | 6/2011 | Arulraja et al. | 180/9.5 |
| 2003/0196839 | A1 | 10/2003 | Moore et al. | |
| 2011/0303470 | A1 * | 12/2011 | Hall | 180/9.1 |

FOREIGN PATENT DOCUMENTS

JP 09315352 12/1997

* cited by examiner

*Primary Examiner* — Lesley D Morris
*Assistant Examiner* — Marlon Arce
(74) *Attorney, Agent, or Firm* — Sughrue Mion, PLLC

(57) ABSTRACT

A retainer cap assembly for attaching a track assembly to a vehicle includes a housing and at least two latch plates disposed in the housing, pivotable about a common pivot axis, between a locked and an unlocked position. A lock bar is rotatably supported on the housing, wherein the lock bar rotates about an axis perpendicular to the pivot axis of the latch plates, so as to be selectively engaged with both of the latch plates to prevent the latch plates from rotating on the pivot axis when the latch plates are in a locked position and disengaged with both of the latch plates to allow the latch plates to rotate on the pivot axis when the latch plates are in an unlocked position.

15 Claims, 16 Drawing Sheets

SELF-STORING RETAINER CAP ASSEMBLY

BACKGROUND

1. Field

Aspects of the exemplary embodiments relate to a retainer cap assembly for vehicles utilizing removable track assemblies, and a method of installation therefor.

2. Related Art

In the related art, large construction equipment, such as earth moving equipment, is disassembled for transport to comply with transportation width and weight requirements. In the case of crawler cranes, for example, the track assemblies are removed from both sides of the crane prior to transport, and then reattached to the crane at the work site.

Retainer caps are generally used to retain the tracks on the crane. The retainer caps are temporarily installed on the mount beams, while the tracks are installed on the crane. However, when the tracks are removed from the crane, the retainer caps must be removed separately and stowed. The related art retainer caps are generally cumbersome to handle, and tools are needed to install and remove the related art retainer caps.

SUMMARY

An apparatus consistent with an exemplary embodiment, includes a retainer cap assembly permanently attached to a track assembly, wherein the track assembly can be installed and removed from a vehicle while the retainer cap assembly remains attached to the track assembly.

The retainer cap assembly for a vehicle may include a housing, at least two latch plates disposed in the housing, pivotable about a common pivot axis, between a locked and an unlocked position, and a lock bar rotatably supported on the housing. The lock bar rotates about an axis perpendicular to the pivot axis of the latch plates, so as to be selectively (1) engaged with both of the latch plates to prevent the latch plates from rotating on the pivot axis when the latch plates are in a locked position and (2) disengaged from both of the latch plates to allow the latch plates to rotate on the pivot axis when the latch plates are in an unlocked position.

According to another exemplary embodiment, a track assembly having a retainer cap for locking and unlocking the track assembly onto a vehicle having at least one mount beam, includes a track frame having an opening, wherein the track frame opening is adapted to be received on the mount beam of the vehicle so as to be attachable and detachable from the vehicle. The retainer cap apparatus includes a housing having an opening therein, the housing fixed to the track frame so that the housing opening and the track opening align, and a pair of latch plates disposed in the opening of the housing, each of the latch plates having an outer end and an inner end, a notch formed at the outer end, and rotatable in the housing opening along a same, or common, pivot axis. A lock bar is provided with a first end rotatably supported on the housing, wherein the lock bar rotates about an axis perpendicular to the pivot axis of the latch plates, so as to be selectively (1) engaged with both of the notches of the latch plates to prevent the latch plates from rotating on the pivot axis when the latch plates are in a locked position and (2) disengaged from both of the notches of the latch plates to allow the latch plates to rotate on the pivot axis when the latch plates are in an unlocked position.

Further, an exemplary embodiment includes a vehicle having a removable track assembly, which includes one or more mount beams for receiving a track assembly thereon, wherein the mount beam is slidingly inserted into an opening of the track assembly and an opening provided on the track assembly for receiving a mount beam of a vehicle. Further, an opening is provided on an end plate of a distal end of the mount beam, wherein the end plate opening and the track assembly opening are in alignment while the track assembly is received on the mount beam. A pair of latch plates protrudes from the track assembly opening into the end plate opening and the latch plates are pivotable between an unlocked position in which the track assembly is movable with respect to the mount beam, and a locked position in which the track assembly is prohibited from moving with respect to the mount beam. The latch plates grip the end plate against the track assembly in the locked position.

According to a method of installing a track assembly onto a vehicle, the track assembly includes a retainer cap assembly mounted thereto, and the retainer cap assembly includes a housing, a pair of latch plates and a lock bar disposed on the housing for engaging with the latch plates. The method includes sliding the track assembly, having the retainer cap assembly mounted thereto, onto a mount beam of the vehicle, rotating the pair of latch plates into a locked position against a portion of the mount beam, pivoting the lock bar into engagement with the latch plates so as to prevent the latch plates from rotating, and securing the lock bar to the housing.

BRIEF DESCRIPTION OF THE DRAWINGS

Aspects of the exemplary embodiment will be more apparent by describing exemplary embodiments with reference to the accompanying drawings, in which.

DETAILED DESCRIPTION

Figure 1:
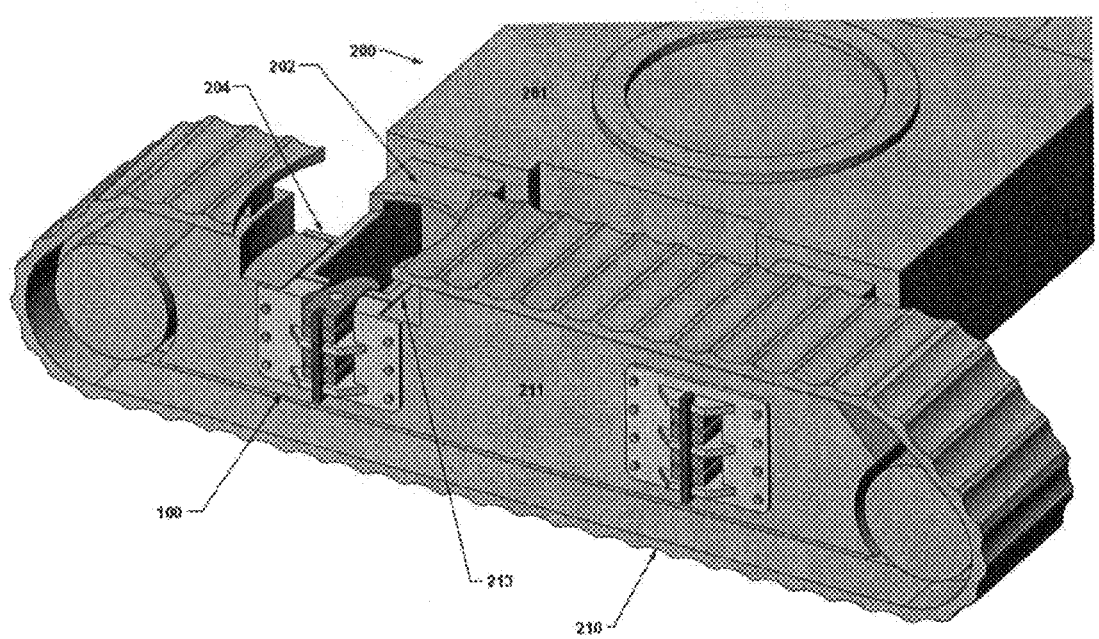
FIG. 1 is a cutaway perspective view of a retainer cap assembly in a locked position according to an exemplary embodiment.

An exemplary embodiment will now be described in conjunction with the appended drawing figures.

In the following description, the same drawing reference numerals are used for the same elements even in different drawings. The matters defined in the description, such as detailed construction and elements, are provided to assist in a comprehensive understanding of the inventive concept. Thus, it is apparent that the exemplary embodiment can be carried out without those specifically defined matters. Also, well-known functions or constructions are not described in detail since they would obscure the invention with unnecessary detail.

FIG. 1 illustrates an isometric view of a construction vehicle having a track assembly disposed thereon according to an exemplary embodiment. The present inventive concept will be described in connection with this type of construction vehicle, referred to as a machine with crawler tracks, but the present inventive concept is not limited to this particular kind of construction vehicle and may be directed to other earth moving equipment or any vehicle requiring installation and removal of equipment thereon, as would be understood by one skilled in the art.

Generally, a track assembly 210 on a construction vehicle 200 must be removed during transportation to or from a job site, in order to meet width and weight requirements for transport. Conventionally, the removal of a track assembly requires that a retainer cap, which fixes the track assembly onto the vehicle, be removed, and then the track assembly is removed from the construction vehicle.

Figure 8:
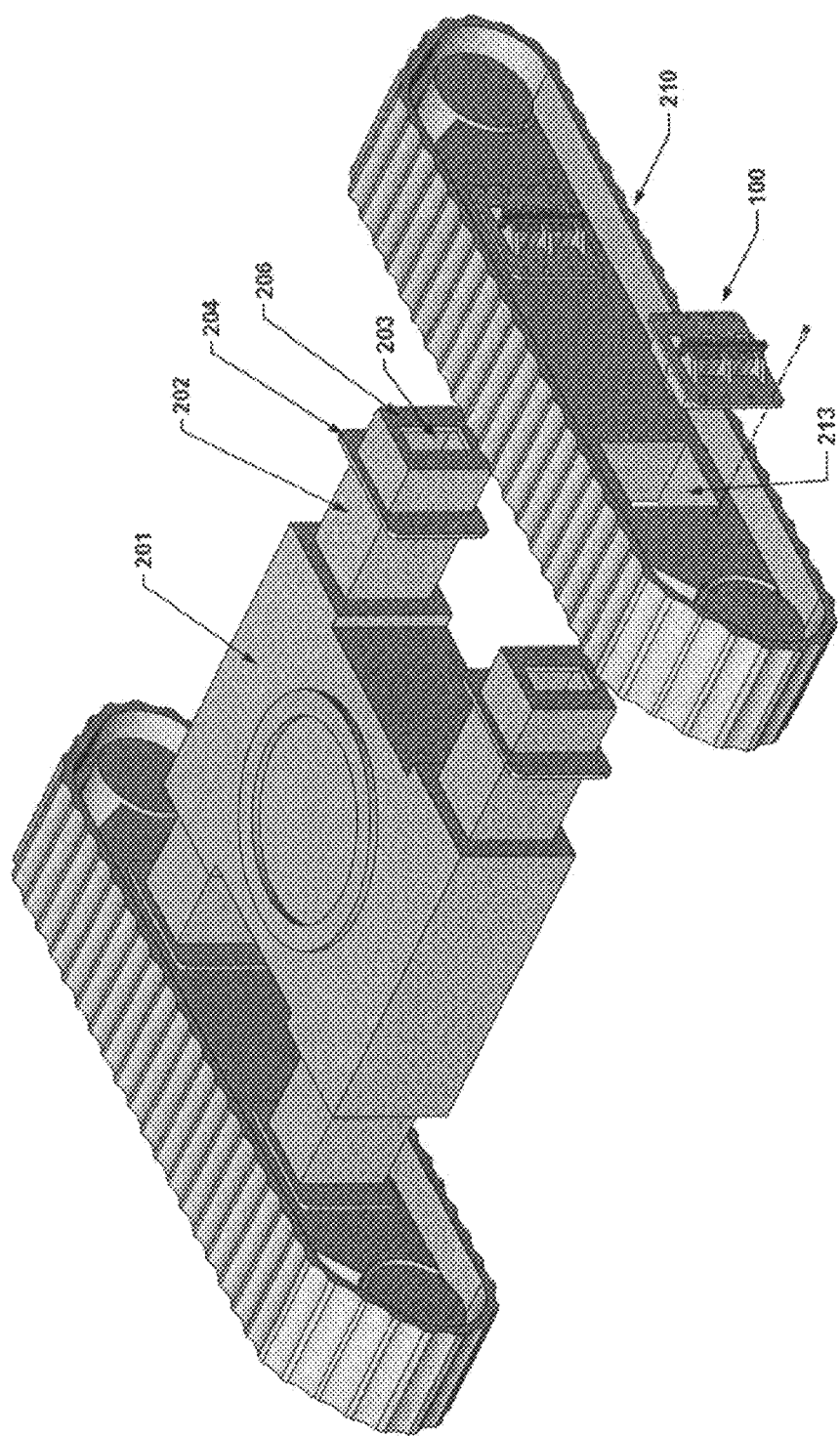
FIG. 8 is an exploded view of the retainer cap assembly, track assembly and vehicle according to an exemplary embodiment.

The construction vehicle 200 may include a body 201 (e.g., central body) having a pair of parallel box mount beams 202 which extend outward from the central body 201 to accept a track assembly 210 thereon. As illustrated in FIGS. 1 and 8, each track assembly 210 includes a track frame 211 having openings 213 for receiving each distal end of the mount beams 202. Thus, the track assembly 210 slides on and off the mount beams 202 for installation and removal from the vehicle 200. The mount beams 202 may each include a flange plate 204 so that when the track assembly 210 is assembled to the vehicle 200, the track assembly 210 slides on the distal end of the mount beam 202 until it abuts the flange plate 204.

In the related art, the retainer cap is bolted directly to the distal end of the mount beams through the track frame opening, thereby wedging the track frame between the flange plate 204 and the retainer cap so that the track assembly 210 is secured to the body 201.

The exemplary embodiment provides for a retainer cap assembly 100 that is fixed to the track assembly 210 instead of the mount beam, and remains attached to the track assembly 210 during installation and removal. Thus, the retainer cap assembly 100 is self-storing because it is not removed from the track assembly 210, even during the process of removing the track assembly 210 from the vehicle 200 and subsequent to the removal procedure.

Figure 2:
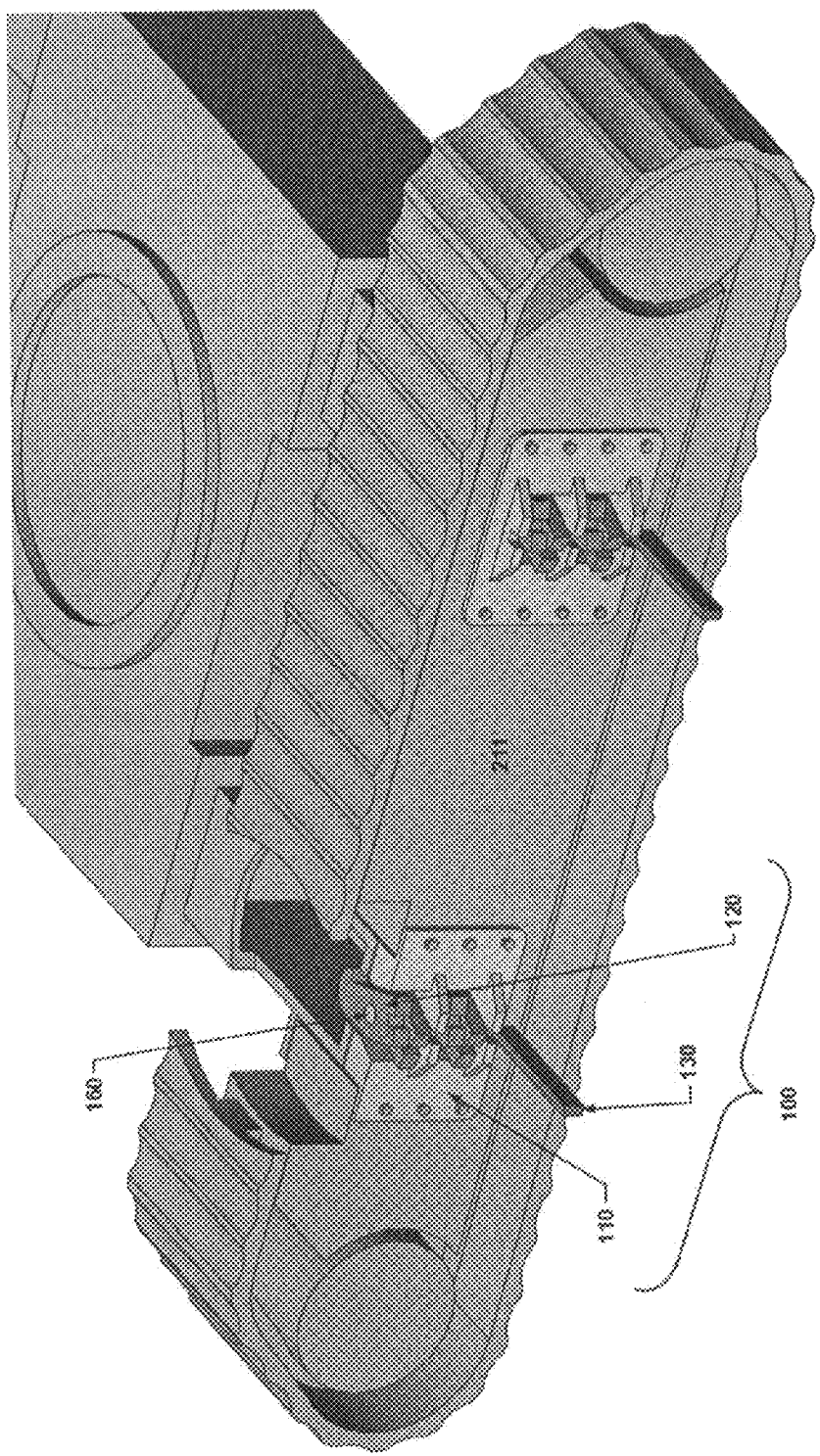
FIG. 2 is a cutaway view of a retainer cap assembly in an unlocked position according to an exemplary embodiment.

According to an exemplary embodiment shown in FIG. 2, the retainer cap assembly 100 includes a housing 110, latch plates 120 and a lock bar 130. The housing 110 is bolted around a perimeter of the opening 213 of the track frame 211. Thus, even while the track assembly 210 is being removed from the body 201, and after it is detached from the body 201, the retainer cap assembly 100 remains bolted to the track assembly 210.

Referring to FIG. 8, on the left side of the track assembly 210, the left retainer cap assembly 100 is detached for illustrative purposes only. The right retainer cap assembly 100 illustrates how the retainer cap assembly 100 remains fixed to the track assembly when the track assembly 210 is detached from the vehicle.

Figure 5A:
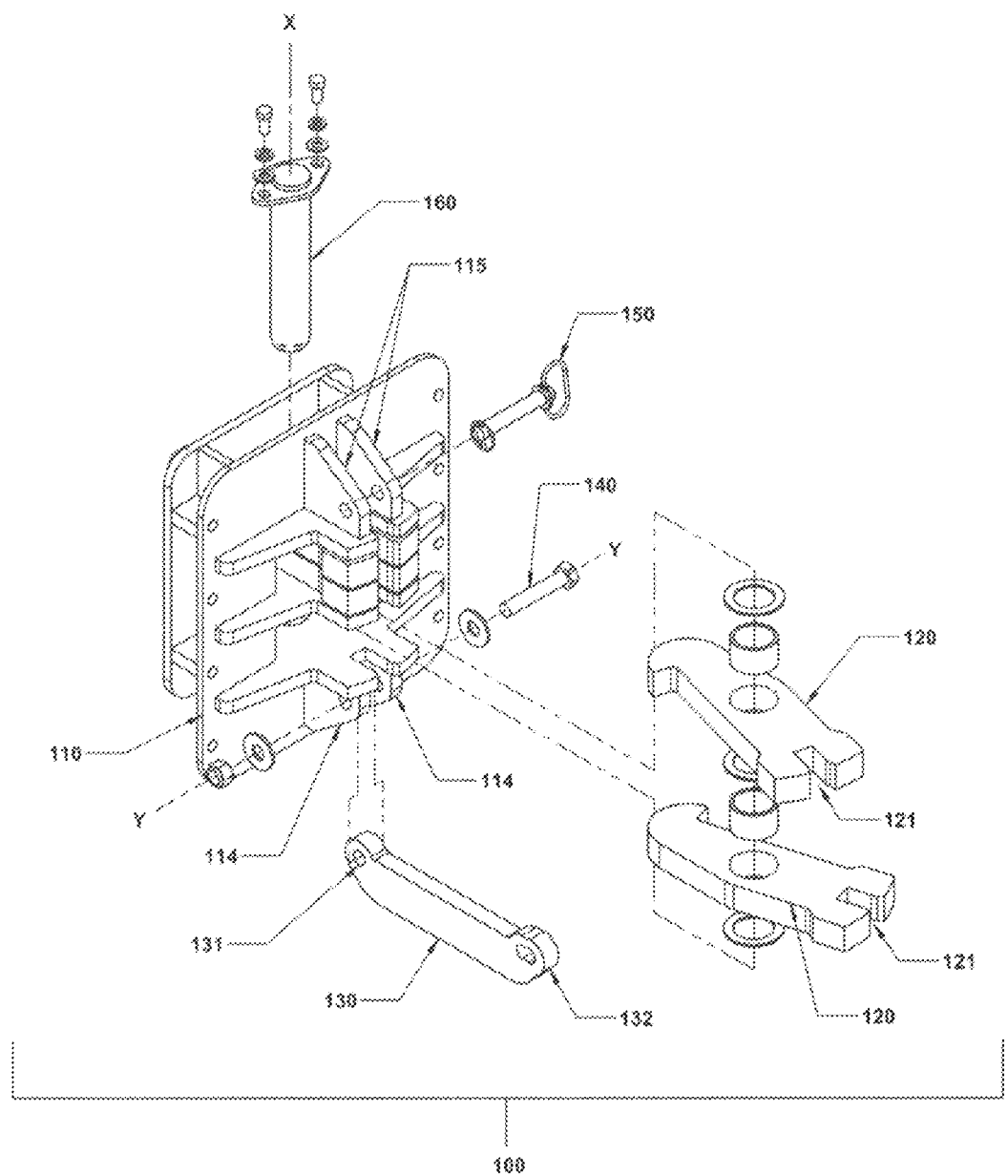
FIG. 5A is an unassembled perspective view of a retainer cap assembly according to an exemplary embodiment.

Referring to FIG. 5A, a central pin 160 is provided as a pivot axis, allowing the latch plates 120 to swing back and forth, i.e., rotate or pivot, about pivot axis X. The range of motion is limited by an opening 111 (e.g., see FIG. 7A) of the housing 110.

Figure 3:
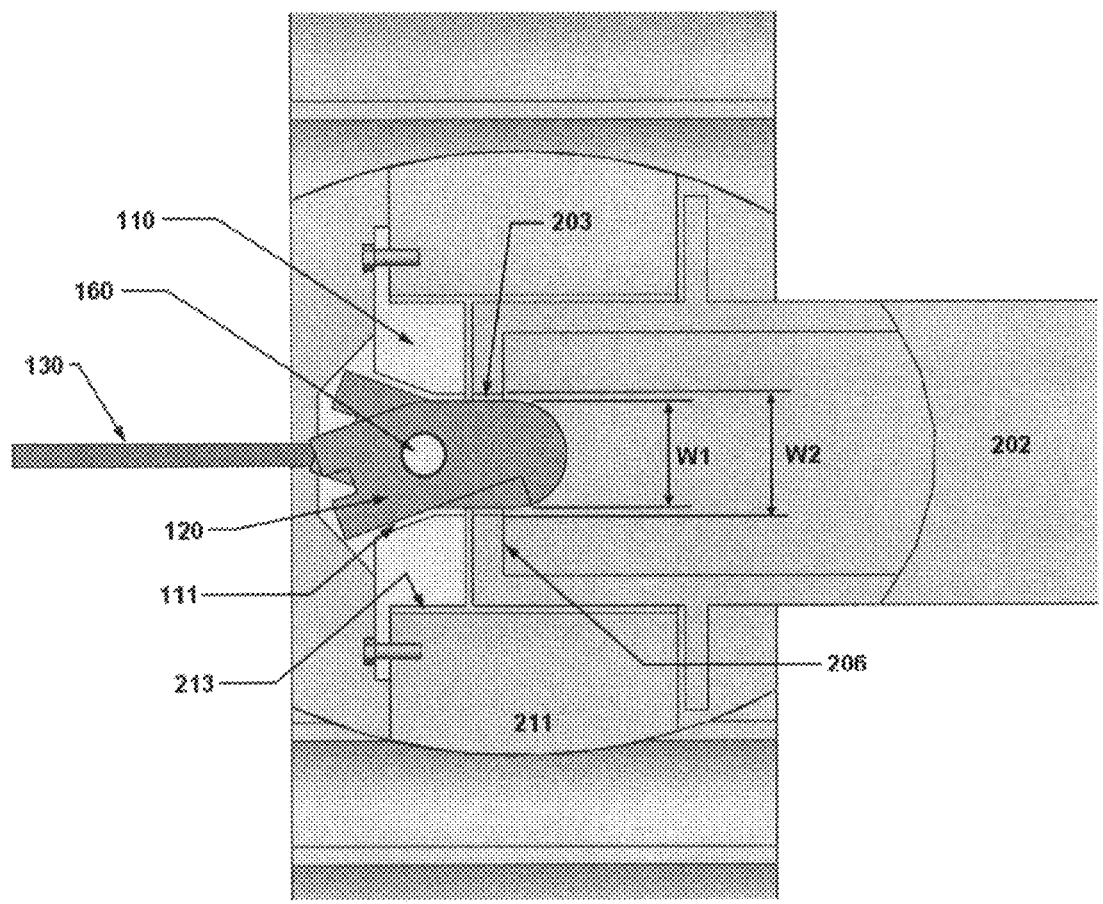
FIG. 3 is an enlarged cutaway top view of a retainer cap assembly in the unlocked position according to an exemplary embodiment.

FIG. 3 illustrates the retainer cap assembly 100 in an unlocked position, wherein the latch plates 120 are rotated in such a manner that they do not obstruct movement of the track assembly 210 with respect to the mount beam 202 of the central body 201. The shape and dimension of the opening 111 is large enough to allow the latch plates 120 to swing into this unobstructed position. In the example shown in FIG. 3, the opening 111 is shown in cross-section, wherein a width of the opening is wider at an outer side than an inner side, as explained in further detail with respect to FIG. 7C.

Figure 4:
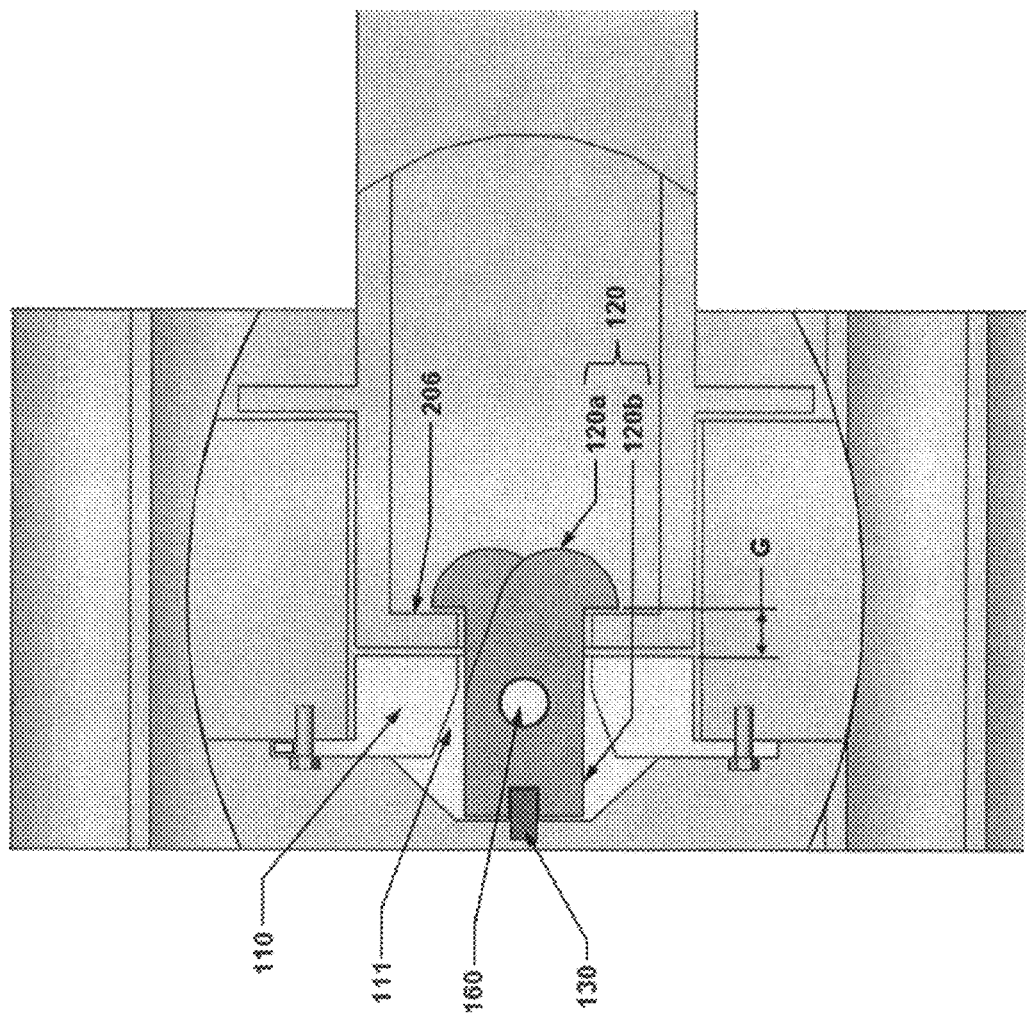
FIG. 4 is an enlarged cutaway top view of a retainer cap assembly in the locked position according to an exemplary embodiment.

FIG. 4 illustrates the retainer cap assembly 100 in a locked position, wherein the latch plates 120 are rotated in such a manner that they obstruct movement of the track assembly 100 with respect to the mount beam 202 of the central body 201.

Comparing FIGS. 3 and 4, when the retainer cap assembly 100 is in a locked position (FIG. 4), the two latch plates 120 (superimposed over each other in the view of FIG. 4), each having an inner end 120a and an outer end 120b, are positioned so that an end plate 206 of the mount beam 202 is held between the latch plate 120 and the retainer cap assembly housing 110. For example, a gripping face 122 (see FIGS. 6A-B) can be provided on the inner end 120a to grip or hold a distal end (e.g., end place 206) of the mount beam 202 between the latch plate 120 and the retainer cap assembly housing 110. Other structures can be used instead of the gripping face 122 to perform the gripping or holding function, as long as the latch plate 120 is able to securely hold onto the mount beam 202.

On the other hand, when the retainer cap assembly 100 is in an unlocked position (FIG. 3), the latch plates 120 (superimposed over each other in the view of FIG. 3), are positioned in the unobstructed position so that the inner end 120a cannot grip the distal end of the mount beam 202, thereby allowing the track assembly 210 to slide off the mount beam 202. The particular dimensional relationships which allow for the locking and unlocking are detailed below.

FIGS. 5A-5E show detailed views of the retainer cap assembly 100. Each retainer cap assembly 100 includes at least the housing 110, the lock bar 130, and latch plates 120.

The lock bar 130 has a first end 131 and a second end 132. The first end 131 is rotatably fixed to the housing 110, and the second end 132 swings freely about the axis of rotation Y. In this exemplary embodiment, the lock bar 130 may be fixed to the housing 110 by a pair of pin plates 114 and a lock bar pin 140 that is received both openings of the pin plates 114 and an opening of the first end 131 of the lock bar 130. However, any structure may be used to perform the function of rotatably mounting the lock bar 130 to the housing 110, as would be understood by one skilled in the art.

The second end 132 of the lock bar 130 has an opening for receiving a quick release pin 150. A pair of pin plates 115 are provided on opposing sides of the second end 132 of the lock bar 130, similar to the pin plates 114 provided for the first end 131 of the lock bar 130, when in the locked position. However, here the lock bar 130 is removably affixed to the housing 110, so that when the quick release pin 150 is released from the housing 110, the lock bar 130 is released and allowed to swing freely about pivot axis Y.

The latch plates 120 may be provided in any number that would not be unduly burdensome to the operator. In the exemplary embodiment shown in FIGS. 5A-5E, two pairs of latch plates 120 are provided (e.g., see FIG. 5B). The outer end 120b of each latch plate 120 has a notch or slot 121 which engages and cooperates with the lock bar 130 when the lock bar 130 is rotated against the housing 110 into a locked position.

The latch plates 120 rotate or pivot about a common pivot axis X, which is perpendicular to the pivot axis Y of the lock bar 130. A central pin 160 defines the pivot axis X in this exemplary embodiment, however, any comparable structure may be used to perform the function of allowing the pivot movement of the latch plates so that they are able to pivot about in opposing directions, as would be understood by those skilled in the art.

An operator may manually pivot the latch plates 120 into the locked and unlocked positions. The lock bar 130 may also be manipulated by an operator, who manually inserts or releases the quick release pin 150, and allows the lock bar 130 to pivot about the lock bar pivot axis Y into the locked and unlocked positions.

As noted above, when the lock bar 130 engages with the notches or slots 121 of the latch plates 120, the latch plates 120 are prevented from rotating about the pivot axis X due to the interference provided by the lock bar 130. The lock bar 130 is only able to engage with the notches or slots 121 when the notches or slots 121 are aligned with each other. If the latch plates 120 are not rotated into their locked positions, the lock bar 130 cannot fit into the notches 121 because they will not be aligned properly to accept the lock bar 130. This feature ensures the locked condition of the assembly.

FIGS. 5B-5E illustrate different views of the retainer cap assembly in a locked position according to the exemplary embodiment. Previously discussed reference characters may be omitted for the sake of clarity. The locked position can be visually confirmed by the alignment of the outer ends 120b of the latch plates 120, and the position of the lock bar 130 in the notches or slots 121 of the latch plates 120, and the insertion of the quick release pin 150. With all these conditions met, an operator may visually realize that the retainer cap assembly 100 is in a secured, lock position, for maintaining the track assembly 210 on the vehicle 200.

Figure 6A:
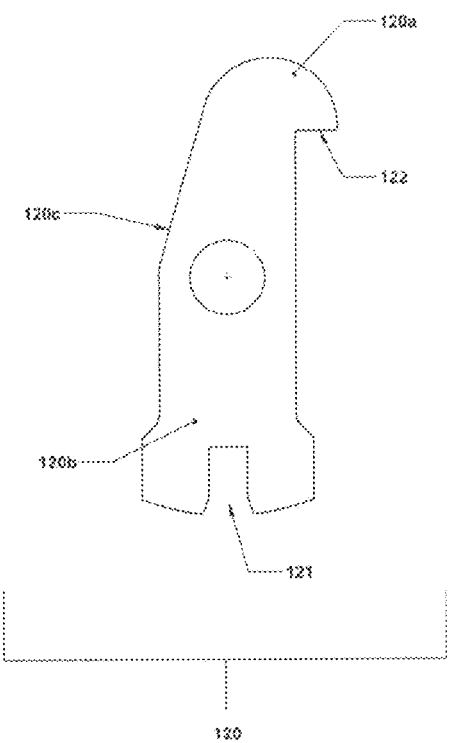
FIGS. 6A-6B are enlarged views of a pair of latch plates according to an exemplary embodiment.
Figure 6B:
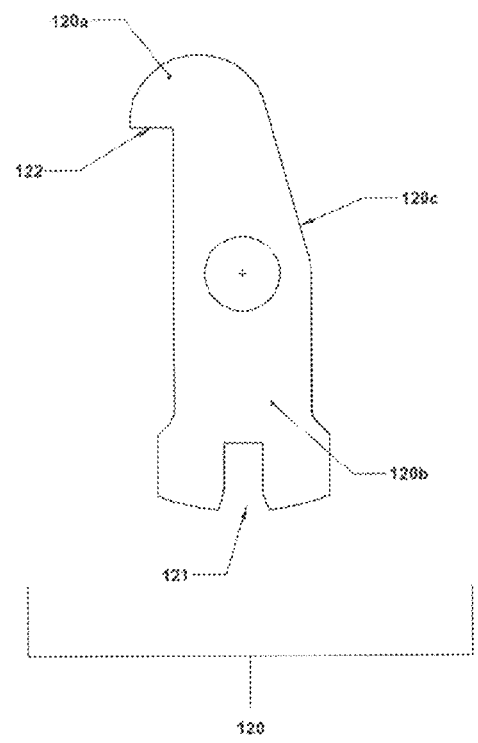

FIGS. 6A-6B illustrate a shape that may be used for the latch plates according to an exemplary embodiment. As shown in FIGS. 6A-6B, the inner end 120a of each latch plate 120 has a hook-like shape which defines the gripping face 122. The latch plates 120 are provided as mirror images of each other, so that the hook-like shapes extend in opposing directions. This arrangement allows for the inner ends 120a to obstruct or not obstruct movement between the mount beam 202 and the track assembly 210 as discussed above with regard to FIGS. 3 and 4.

In particular, the pair of latch plates 120 have opposite images, i.e., the latch plates are mirror images of each other. The outer ends 120b have the notches 121 for accepting at least a part of the lock bar 130 therein. The inner ends 120a have a hook-like shape, with the gripping face 122 which faces the outer ends 120b thereof. When installed and pivoted into a locked position on an mount beam 202 of a central body 201, the gripping face 122 faces the housing 110 so that the end plate 206 of a distal end of the mount beam 202 of the central body 201 is pinched between the housing 110 and the gripping face 122 (see FIG. 4). That is, a gap G (see FIG. 5E) is formed between the housing 110 and the gripping face 122, wherein the gap G is large enough to accommodate the end plate 206 of the mount beam 202 therebetween. The gap G may be large enough to allow the latch plate 120 to rotate into and out of the locked position. On the other hand, the gap G should be small enough so that there is little play between the gripping face 122 and the end plate 206 of the mount beam 202, to substantially prevent unnecessary rattling and potential damage due to extraneous forces imposed by a loose fit.

A common pivot axis is provided for all the latch plates 120 of the retainer cap assembly 100. Moreover, the shape of the latch plate 120 is generally elongated, with a body portion 120c provided between the inner and outer ends 120a, 120b. The pivot axis X extends through the body portion 120c. The body portion 120c may have a tapered edge so that when the latch plates 120 are rotated into an unlocked position, the latch plates can slide in and out of an opening 203 of the end plate 206 of the mount beam 202. More specifically, referring to FIG. 3 illustrating an unlocked position, a total width $W_1$ of a pair of superimposed latch plates at the widest part of their superimposed inner ends 120a is less than a width $W_2$ of the opening 203 and a width $W_3$ (see FIG. 7C) of the opening 111 at an inner plate 117 of the housing 110.

Figure 5B:
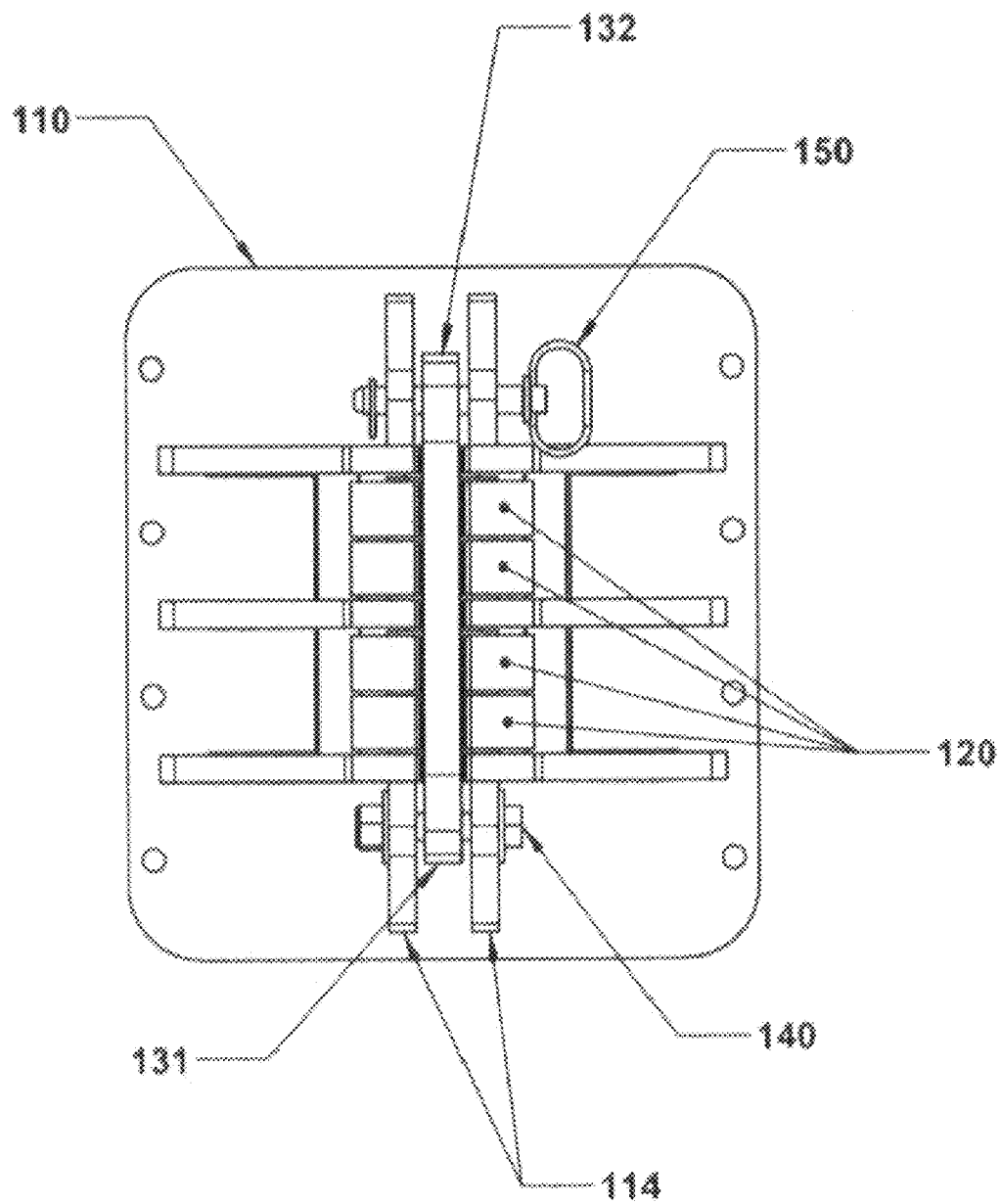
FIG. 5B is a front view of a retainer cap assembly in the locked position according to an exemplary embodiment.
Figure 5C:
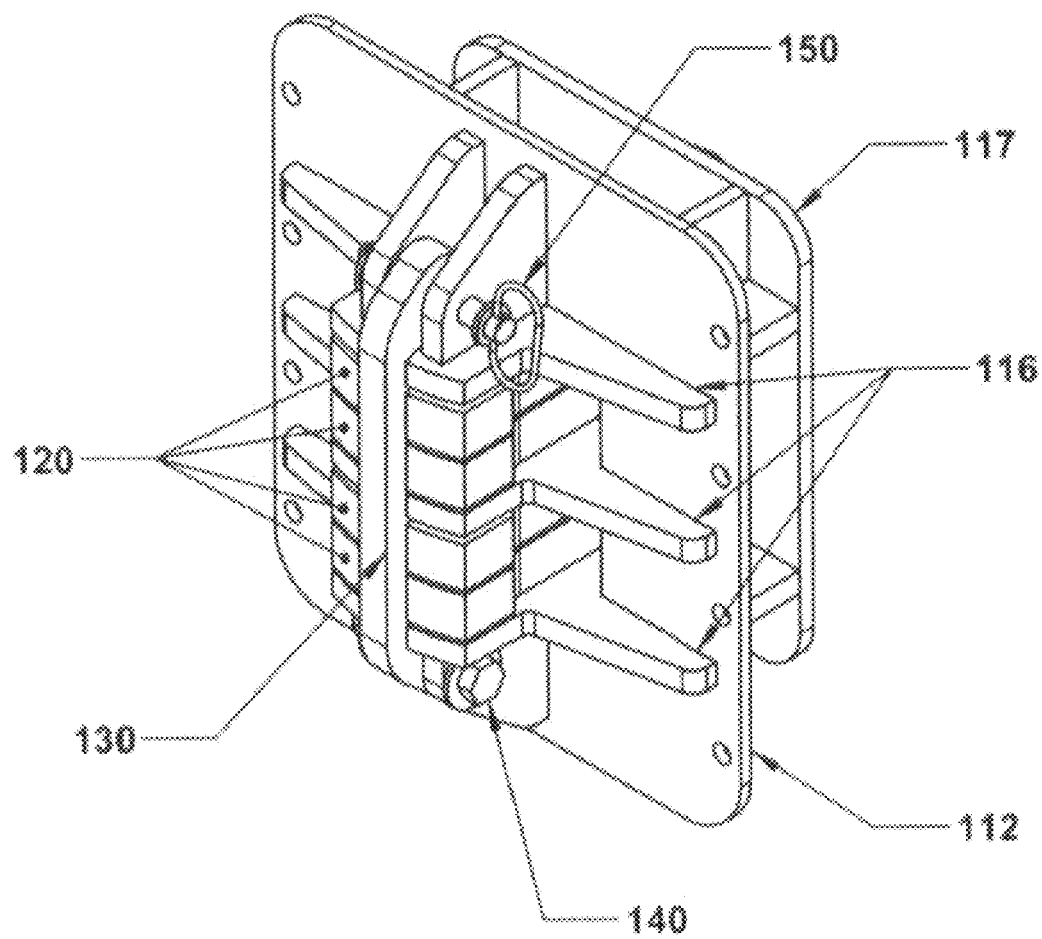
FIG. 5C is a perspective view of a retainer cap assembly in the locked position according to an exemplary embodiment.
Figure 5D:
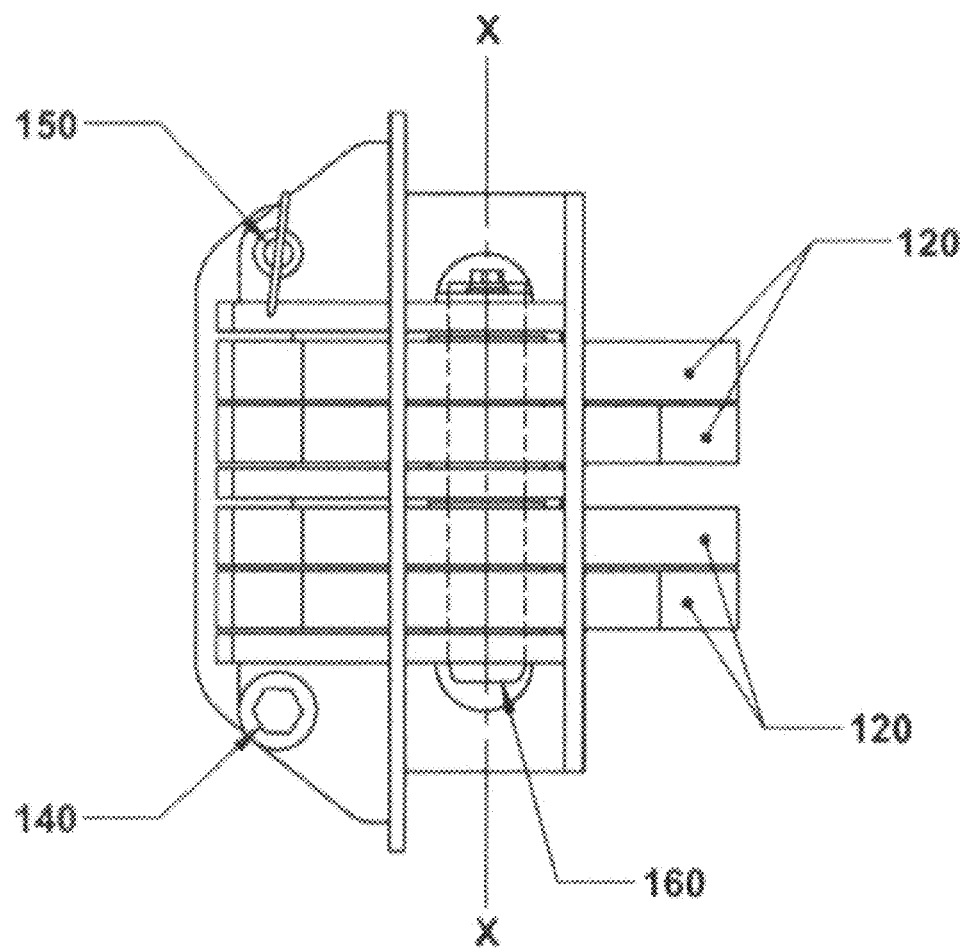
FIG. 5D is a side view of a retainer cap assembly in the locked position according to an exemplary embodiment.
Figure 5E:
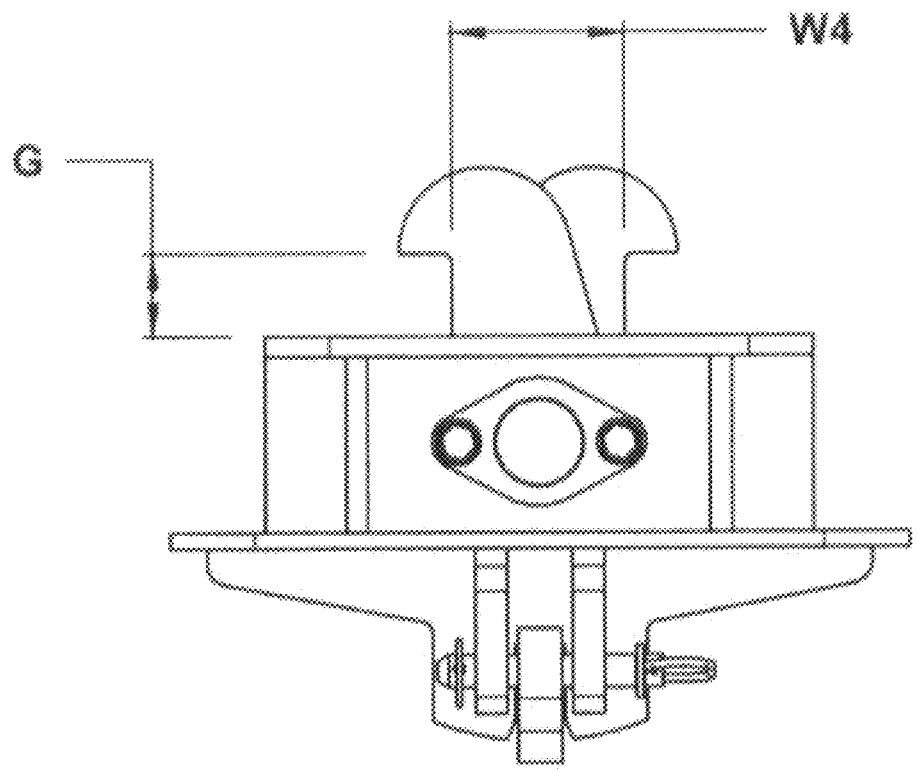
FIG. 5E is a top view of a retainer cap assembly in the locked position according to an exemplary embodiment.

Moreover, in the locked position, a pair of superimposed latch plates has a total width of $W_4$ at an end of the body portion 120c immediately adjacent to the gripping face 122 (see FIG. 5E). The width $W_4$ is small enough to fit within the opening 203 to avoid hindrance of the pivot movement of the latch plates 120 into the locked condition, wherein the gripping face 122 aligns in a close parallel position with the end plate 206 (see FIG. 4). In this locked condition, the gripping face 122 may abut directly against the end plate 206, or there may be a tolerance between the gripping face 122 and the end plate 206.

Thus, with respect to the various dimensional relationships, the width $W_2$ of the opening 203 is about the same as the width $W_3$ of the opening 111, and the width $W_1$ of the superimposed unlocked latch plates 120 is about the same as the width $W_4$ of the superimposed locked latch plates 120. However, the inventive concept is not limited to this shape. The latch plates 120 may be provided in other shapes as would be understood by one skilled in the art, as long as they meet the requirement of being insertable and removable through the openings of the housing and mount beam, and being pivotable between locked and unlocked positions.

The shape of the notch or slot 121, and the lock bar 130 which fits at least partially therein, is not limited to a particular shape. Although a substantially rectangular shape is illustrated in the drawings, other shapes may be used for the notches and lock bar as long as the lock bar can engage with the notches to substantially prevent them from pivoting or rotating. For example, the notches 121 shown in FIGS. 6A-6B, are flared slightly at their openings, which facilitates engagement of the lock bar 130 therein.

Due to the high strengths needed in earth moving equipment and other construction equipment applications, the latch plates 120 may be about 1 inch thick and formed of a durable metal or alloy according to an exemplary embodiment.

Moreover, the retainer cap assembly must be able to withstand the torsions associated with the counter rotating track frames. The retainer cap assembly described herein may have the strength to withstand at least as much force as related art retainer cap assemblies which are bolted directly to the mount beams.

Figure 7A:
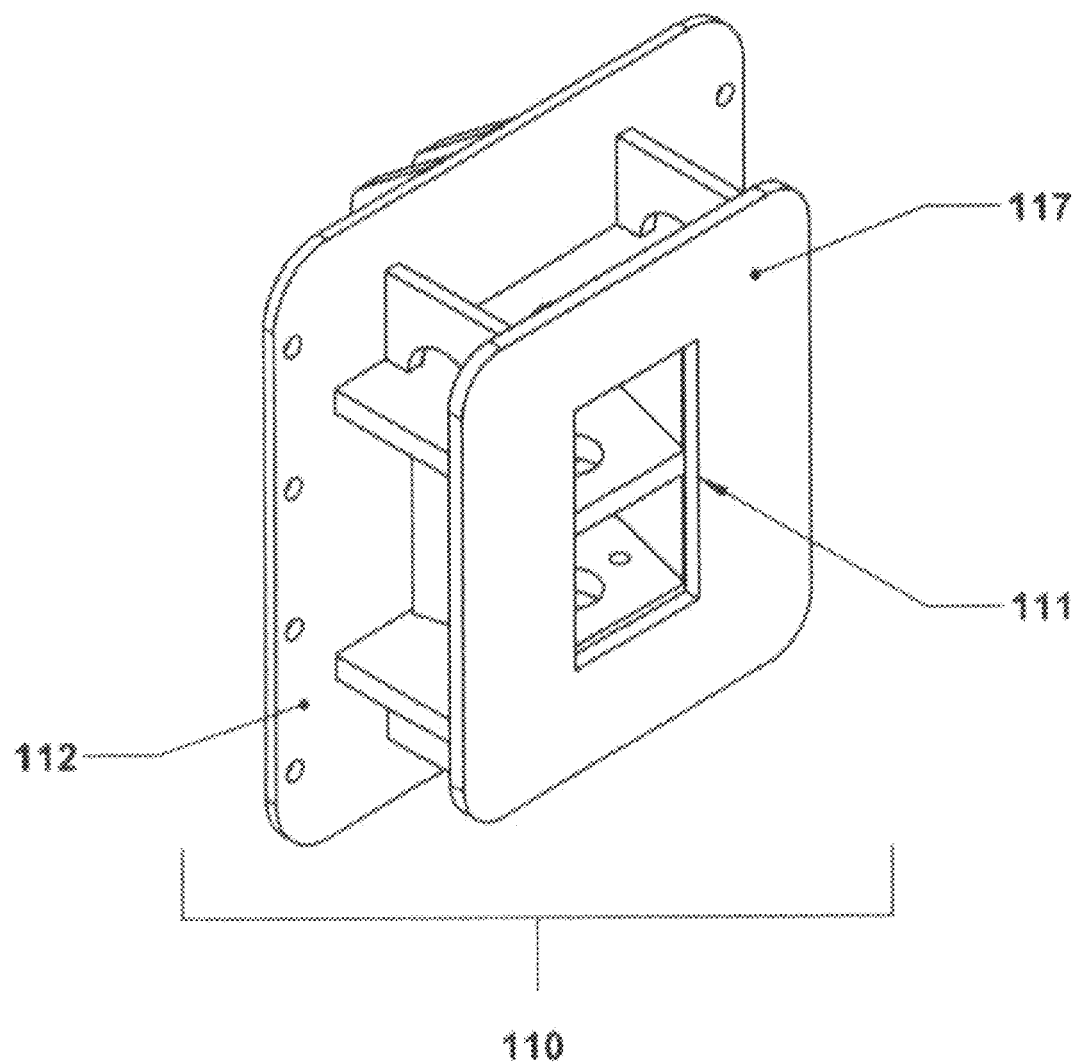
FIG. 7A is a rear perspective view of a retainer cap assembly according to an exemplary embodiment.
Figure 7B:
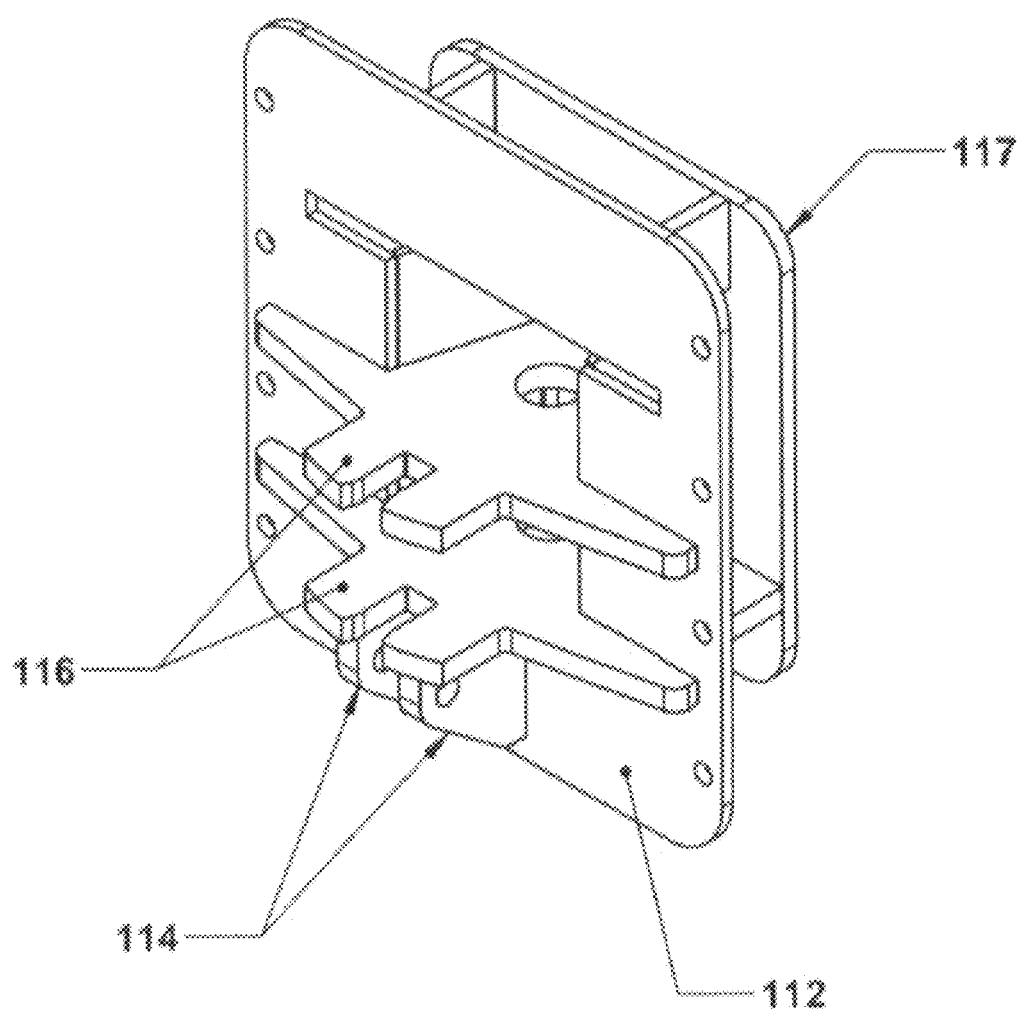
FIG. 7B is a front perspective view of FIG. 7A according to an exemplary embodiment.
Figure 7C:
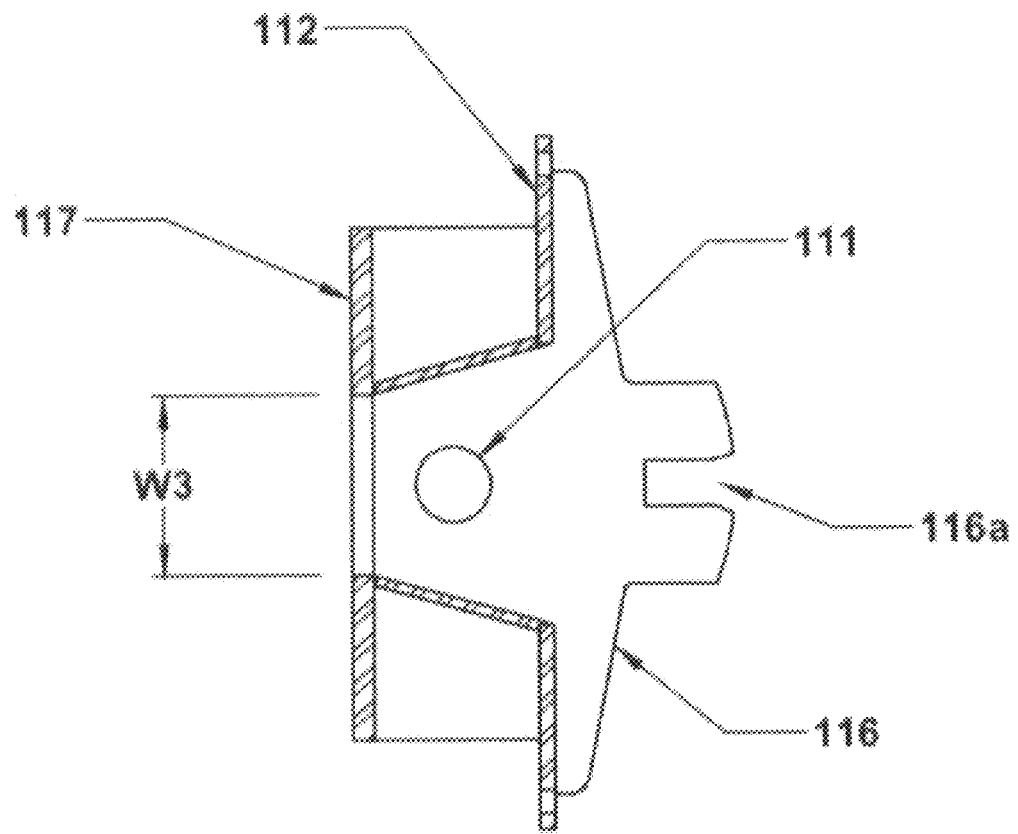
FIG. 7C is a section view of a fixed plate on a mount plate according to an exemplary embodiment.

The housing structure is detailed in FIGS. 7A-7C. The housing 110 includes a mount plate 112 and the inner plate 117, being provided substantially parallel to each other. The opening 111 is provided in the housing 110, extending through the mount plate 112 and the inner plate 117. At least one fixed plate is provided for supporting the latch plates, but any other number of fixed plates may be provided without departing from the scope of the inventive concept. For example, but not by way of limitation, two fixed plates 116 are shown in FIG. 7B and three fixed plates 116 are shown in FIGS. 5A-5D As shown in FIGS. 7B-7C, the fixed plates 116 may be provided in the housing opening 111. As shown in FIG. 7C, the fixed plates 116 may each have a notch 116a, respectively, which correspond in shape and alignment with notches 121 formed on the outer ends 120b of the latch plates 120. If the central pin 160 is provided as the point of the pivot axis X, the central pin 160 may extend through the fixed plate 116, or multiple fixed plates 116 if present. Thus, when the lock bar 130 is brought into the lock position, it pivots about its first end 131 so as to substantially simultaneously engage with the notches on the fixed plate(s) 116 and latch plates 120, as shown in FIG. 5B.

For added stability, the pin plates 114, 115 may be positioned so as to be disposed adjacent to both the mount plate 112 and the fixed plate 116 (FIGS. 5A-5B).

Figure 9:
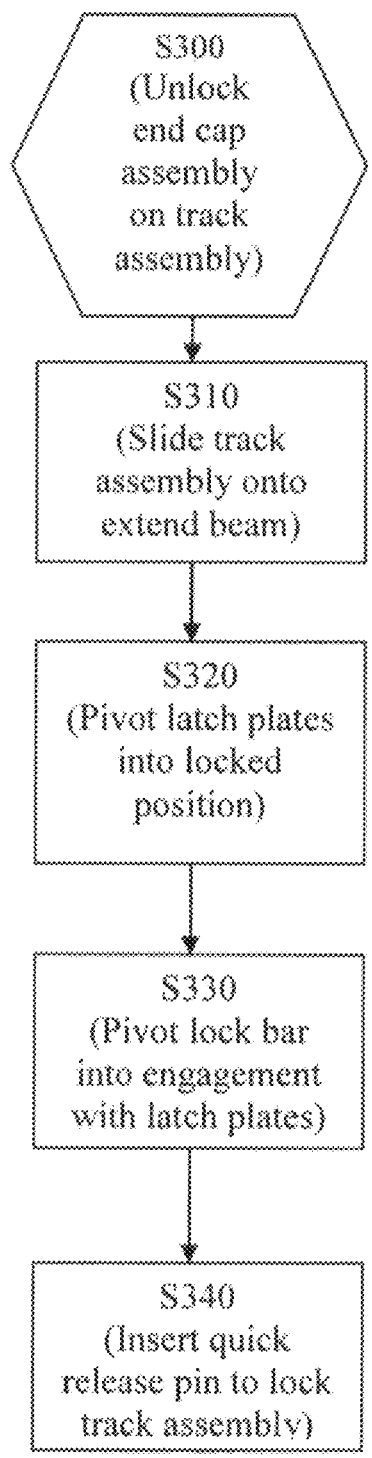
FIG. 9 is a flow chart of a method of installing a track assembly.
Figure 10:
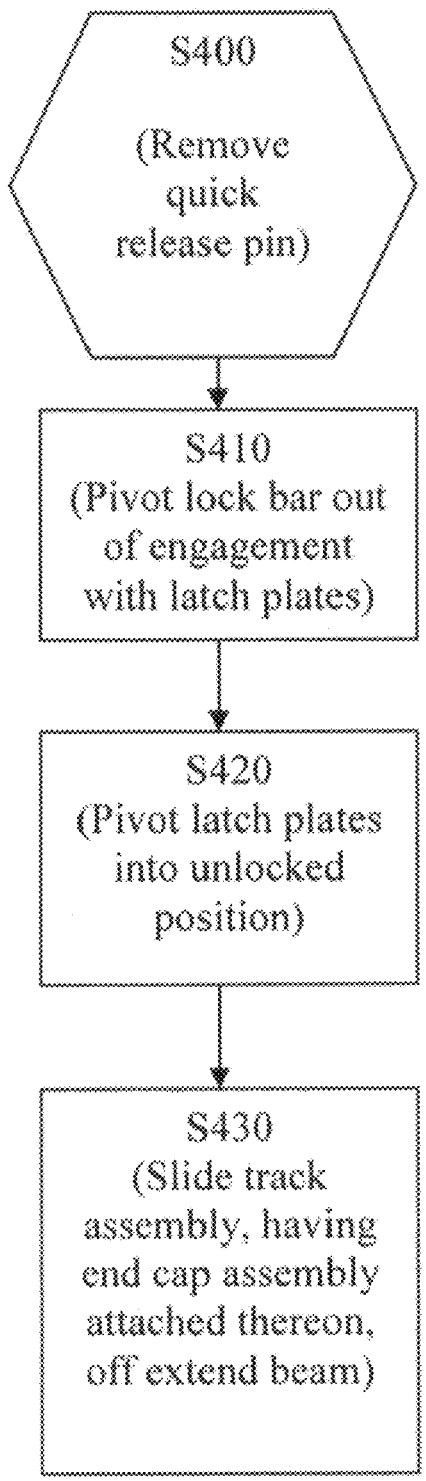
FIG. 10 is a flow chart of a method of removing a track assembly.

A method of using the retainer cap assembly will now be explained in conjunction with FIGS. 9 and 10. As evident by the following description, the exemplary embodiment may enable both the assembly and removal of the track assembly without any extraneous tools. As shown in FIGS. 2, 3 and 8, when the track assembly 210 is to be placed on the central body 201, the latch plates 120 of the retainer cap assembly 100 are placed in the unlocked position, so that the retainer cap assembly 100 does not prohibit movement between the track assembly 210 and the mount beam 202 (Step S300). In other words, there is no obstruction between the latch plates and the openings on the mount beam. The end plate 206 of the distal end of the mount beam 202 fits inside the opening 213 of the track assembly 210 until the track assembly abuts against the flange plate 204 of the mount beam 202. Once the track assembly 210 is fully slid onto the mount beam 202 (Step S310), or more commonly, once the pair of parallel mount beams 202 are engaged with the pair of openings 213 on the track assembly 210, it is possible to manipulate the retainer cap assembly 100 into its locked position, wherein the latch plates 120 are swung into their locked position so that the gripping faces 122 directly face an inner face of the end plate 206 of the distal end of the mount beam 202 so as to essentially grip the inside of the mount beam 202 (Step S320). Once the latch plates 120 are aligned, the operator may swing the lock bar 130 into place (Step 330) and secure it with the quick release pin 150 (Step 340).

With this placement, the gap G provided between the gripping face 122 of the inner end 120a of the latch plate 120 and the inner plate 115 of the housing 110, is wide enough to accept the end plate 206 of the mount beam 202.

Once the retainer cap assembly 100 is locked onto the mount beam 202, the retainer cap assembly 100 provides an interference fit and prevents removal of the track assembly 210 from the central body 201. Moreover, the gripping force is provided in multiple directions, thus, securing the track assembly 210 to the mount beam 202.

To remove the retainer cap assembly 100, the quick release pin 150 is removed (Step S400), the lock bar 130 is swung out of engagement with the notches (Step 410), and the latch plates 120 are pivoted out of engagement with the end plate 206 (Step 420). In this unlocked position, wherein the latch plates are in an unobstructed position, the retainer cap assembly 100 can disengage and be removed from the mount beam 202 without interfering with the opening 203 of the mount beam 202. Thus, Step 430 includes sliding the track assembly 210 having the retainer cap assembly 100 disposed thereon, off of the mount beam 202.

Also, the track assembly can be separated from the vehicle without the need to separately handle and stow the retainer cap assembly. An unlocked position allows the track assembly 210 to slide on and off the mount beams 202 of the central body 201 while the retainer cap 100 remains fixed to the track assembly 210 due to the self-storing capability. While the track assembly 210 is completely detached from the central body 201, the track assembly 210 can be brought into its locked condition on the track assembly, whereby the lock bar 130 and quick release pin 150 are locked into place on the track assembly 210.

The exemplary embodiments may also provide an intuitive, visual confirmation of the locked condition of the retainer cap assembly, so that the user can ascertain whether the retainer cap assembly has been properly locked onto the mount beam. That is, if the locking bar fits in the notches and the quick release pin is engaged, the user knows the assembly is locked. If the locking bar does not fit in the notches, the user can visually confirm that the assembly is not locked.

Thus, the exemplary retainer cap assembly facilitates a method for adding and removing the track assembly with respect to the central body, while also preventing improper positioning of the track assembly. Without requiring any additional tools, the operator can unlock the retainer cap assembly that is disposed on the track assembly, swing the latch plates into an unobstructed position, slide the track assembly onto the mount beam and then swing the latch plates and lock bar into place. It may not be necessary for the operator to use separate tools. Moreover, the operator may not have to guess whether the retainer cap has been properly placed into locked position. Since the lock bar cannot swing into its locked position unless the latch plates are properly placed in their locked positions, the operator can confirm that the retainer cap assembly is in a fully locked position by a simple visual inspection of the apparatus.

Other features may include labels with alignment stripes on the housing and/or latch plates and/or pivot plates.

Still further, each of the plates may be pinned in position instead of utilizing a single lock bar.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A retainer cap assembly, comprising:
   a housing;
   at least two latch plates disposed in the housing, pivotable about a common pivot axis, between a locked and an unlocked position; and
   a lock bar rotatably supported on the housing, wherein the lock bar rotates about an axis perpendicular to the common pivot axis of the latch plates, so as to be selectively (1) engaged with both of the latch plates to prevent the latch plates from rotating on the pivot axis when the latch plates are in a locked position and (2) disengaged with both of the latch plates to allow the latch plates to rotate on the pivot axis when the latch plates are in an unlocked position.

2. The retainer cap assembly according to claim 1, wherein each one of the latch plates comprises an inner end and an outer end, the inner end including a gripping face that faces toward the outer end, and the outer end including a notch that engages with the lock bar.

3. The retainer cap assembly according to claim 2, wherein the inner ends of the at least two latch plates each have a hook-like shape partially defined by the gripping face, the hook-like shape of the inner ends extending in opposing directions.

4. The retainer cap assembly according to claim 1, wherein the housing comprises a mount plate and an inner plate disposed substantially parallel to the mount plate, and an opening in each of the mount plate and the inner plate, wherein the latch plates are disposed in the openings so as to extend longitudinally through the mount plate and the inner plate and being pivotable therein.

5. The retainer cap assembly according to claim 2, wherein the housing further comprises a fixed plate disposed in parallel with the latch plates, the fixed plate having a notch provided at an outer end thereof which corresponds in shape and alignment with the notches of the latch plates when the latch plates are in the locked position, so that while the lock bar is received in the notches of the notch plates, the lock bar is disposed in the notch of the fixed plate.

6. The retainer cap assembly according to claim 2, wherein:
the lock bar is rotatably supported on the housing at a first end that is rotatably fixed to the housing,
the lock bar has a second end that is removably fixed to the housing so as to pivot away from the housing when rotated about the lock bar pivot axis, and
the lock bar is received in the notches of the latch plates when the latch plates are in the locked position, thereby placing the retainer cap assembly in a locked condition.

7. A track assembly having a retainer cap for locking and unlocking the track assembly onto a vehicle having at least one mount beam, comprising:
a track frame having an opening, wherein the track frame opening is adapted to be received on the mount beam of the vehicle so as to be attachable and detachable from the vehicle,
the retainer cap apparatus comprising:
a housing having an opening therein, the housing fixed to the track frame so that the housing opening and the track opening align;
a pair of latch plates disposed in the opening of the housing, each of the latch plates having an outer end and an inner end, a notch formed at the outer end, and rotatable in the housing opening along a same pivot axis; and
a lock bar having a first end rotatably supported on the housing, wherein the lock bar rotates about an axis perpendicular to the pivot axis of the latch plates, so as to be selectively (1) engaged with both of the notches of the latch plates to prevent the latch plates from rotating on the pivot axis when the latch plates are in a locked position and (2) disengaged with both of the notches of the latch plates to allow the latch plates to rotate on the pivot axis when the latch plates are in an unlocked position.

8. The retainer cap apparatus according to claim 7, wherein the inner end of each of the latch plates further includes a gripping face that faces toward the outer end of the latch plate, so that while the latch plates are in a locked condition, the gripping faces face the housing with a gap provided therebetween, wherein a portion of the mount beam fits in the gap when the track assembly is locked on the vehicle so as to be held between the gripping faces and the housing.

9. The retainer cap apparatus according to claim 8, wherein the inner ends of the latch plates each have a hook-like shape partially defined by the gripping face, the hook-shapes extending in opposing directions.

10. The retainer cap apparatus according to claim 8, wherein the housing comprises:
a mount plate that is fixedly mounted to the track frame, wherein the first end of the lock bar is rotatably supported on the mount plate of the housing, and
an inner plate disposed substantially parallel to the mount plate, the gap being provided between the inner plate and the gripping face.

11. The retainer cap apparatus according to claim 10, wherein the housing comprises a fixed plate disposed in parallel with the latch plates, having a notch provided at an outer end thereof which corresponds in shape and alignment with the notches of the latch plates when the latch plates are in the locked position, so that while the lock bar is received in the notches of the notch plates, the lock bar is disposed in the notch of the fixed plate.

12. The retainer cap apparatus according to claim 11, further comprising:
a quick release pin;
a pin plate having an opening, formed on the mount plate; and
an opening formed at a second end of the lock bar,
wherein the quick release pin is removably inserted into the openings of the pin plate and the lock bar when the lock bar is received in the notches of the latch plates, thereby placing the retainer cap assembly in a locked condition.

13. The retainer cap apparatus according to claim 10, wherein the gap has a width capable of accommodating an end plate of a distal end of the mount beam when the track assembly is attached to the vehicle.

14. A vehicle having a removable track assembly, comprising:
a mount beam configured to receive a track assembly thereon, wherein the mount beam is slidingly inserted into an opening of the track assembly;
an opening provided on the track assembly configured to receive a mount beam of a vehicle;
an opening provided on an end plate of a distal end of the mount beam, wherein the end plate opening and the track assembly opening are in alignment while the track assembly is received on the mount beam;
a pair of latch plates that protrude from the track assembly opening into the end plate opening; and
the latch plates being pivotable between an unlocked position in which the track assembly is movable with respect to the mount beam, and a locked position in which the track assembly is prevented from moving with respect to the mount beam,
wherein the latch plates grip the end plate against the track assembly in the locked position.

15. A method of installing a track assembly onto a vehicle, wherein the track assembly includes a retainer cap assembly mounted thereto, the retainer cap assembly comprising a housing, pair of latch plates and a lock bar disposed on the housing for engaging with the latch plates, comprising:
sliding the track assembly, having the retainer cap assembly mounted thereto, onto a mount beam of the vehicle;
rotating the pair of latch plates into a locked position against a portion of the mount beam;
pivoting the lock bar into engagement with the latch plates so as to prevent the latch plates from rotating; and
securing the lock bar to the housing.

* * * * *